Oct. 28, 1969
J. R. METZ
3,474,506
QUICK RELEASE PIN
Filed May 12, 1967
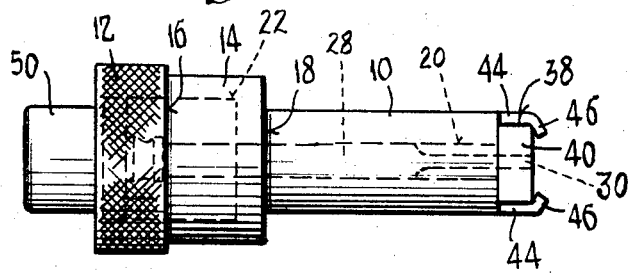
Fig.1
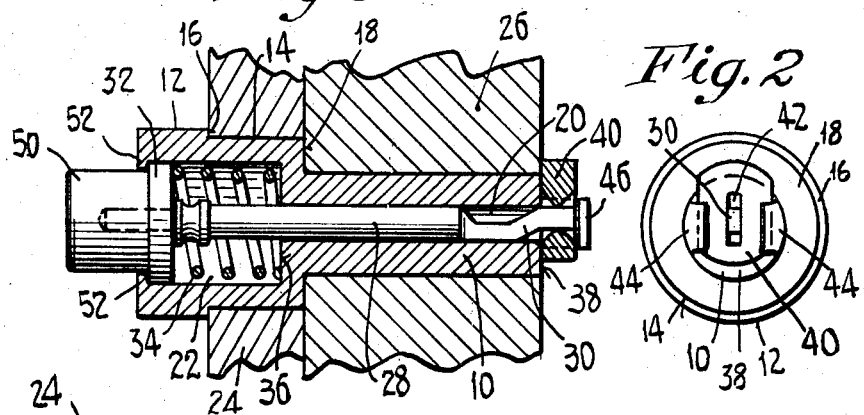
Fig.3
Fig.2
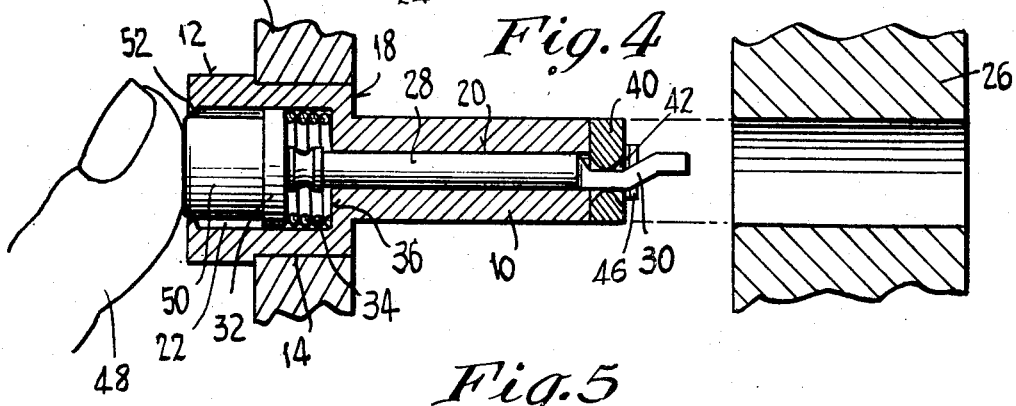
Fig.4
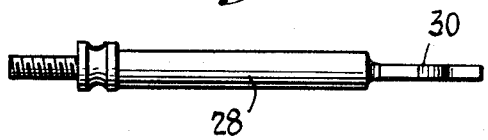
Fig.5
INVENTOR.
Joseph R. Metz
BY
*H. Gilbreth Lehmann*
AGENT

United States Patent Office

3,474,506
Patented Oct. 28, 1969

3,474,506
QUICK RELEASE PIN
Joseph R. Metz, Ridgefield, Conn., assignor to Norco, Inc., Ridgefield, Conn., a corporation of Connecticut
Filed May 12, 1967, Ser. No. 638,014
Int. Cl. F16b 21/09
U.S. Cl. 24—211                                                          5 Claims

ABSTRACT OF THE DISCLOSURE

A quick release clevis pin or the like, having a transversely grooved forward end in which a transversely movable locking dog is retained by folded-in ears on the pin. A release rod extends longitudinally through a bore in the clevis pin, having at its forward end a sloped cam portion extending through an opening in the dog to actuate the same in response to longitudinal movement of the rod. The rearward end of the rod has a finger-engageable button protruding from the associated end or head of the clevis pin.

CROSS REFERENCES

U.S. Patents Nos. 3,184,816; 2,324,687; 2,350,550; 2,572,022; 2,620,537; 3,079,829; Swedish Patent No. 41,337, and U.S. Patent No. 2,782,672.

BACKGROUND

This invention relates to quick release pins, clevis pins and the like, and more particularly to hollow pins having release or actuating rods extending through their bodies. In prior quick release pins of the type referred to, a usual construction consists of a tubular pin body in which there is longitudinally movable a release rod, said pin body having a location spaced from its forward end a pair of aligned transverse apertures or bores movably carrying a locking dog or piece having a path extending in general at right angles to the axis of the pin body. While such arrangement is satisfactory for many applications, it has several drawbacks. The construction of the pin body, involving the transverse bores, is somewhat costly and time-consuming as regards its manufacture in quantity. Moreover, the location of the locking dog at a point spaced rearward from the foreward end of the pin body results in said forward end projecting an appreciable distance beyond or past the surface against which the locking dog acts. Additionally, there is the likelihood of dirt collecting in the transverse bores and around the locking dog, which tends to limit the free movement of the dog and the release rod. Such dirt, moreover, is not easily dislodged.

SUMMARY

The present invention obviates the above disadvantages of prior quick-release clevis pins and the like, and objects of the invention are to provide a novel and improved quick release pin which is especially simple in its construction, and characterized by a low mass-production cost as well as relatively inexpensive tooling. The objects of the invention also include the provision of a clevis pin as above set forth, wherein the various components in addition to being quickly and easily manufactured, are also easily assembled into their operable relationships with a minimum of cost.

The foregoing objects are accomplished by the provision of a quick-release pin having a tubular pin body carrying a release rod in its bore, said pin body at its extreme forward end or tip being provided with an open groove that extends transversely across said end, and with a pair of projecting retainer ears disposed on opposite sides of the transverse groove. The construction further comprises a locking dog which is disposed in and longitudinally movable along the transverse groove at the end of the pin body, between a non-projecting non-locking position and a projecting locking position.

The transverse groove in the end of the pin body can be easily and quickly machined by inexpensive production techniques, and the remaining stock at the sides of the groove will constitute the projecting ears which serve the double purpose of guiding the locking dog and also retaining the same in the transverse groove. The foregoing construction also advantageously disposes the locking dog at the very end of the pin body, whereby the latter does not have portions projecting appresiably beyond the locking dog and the cooperable surface against which the dog acts.

Other objects and advantages of the invention are to provide an improved quick-release clevis pin or the like, which can be constructed to have an especially small diameter whereby it is readily adaptable to small and compact cooperable assemblages; to provide a pin construction as outlined, which is sturdy, foolproof and reliable in its operation, and relatively strong considering its physical size; to provide an improved quick-release pin which may be easily operated to effect its attachment and release or removal; and to provide a pin in accordance with the foregoing, which has the fewest possible parts characterized by the simplest possible construction.

Other features and advantages will hereinafter appear.

In the drawings:

FIG. 1 is a top plan view of a quick-release clevis type pin as provided by the invention.

FIG. 2 is a front end elevational view of the quick-release pin of FIG. 1.

FIG. 3 is an axial sectional view of the quick-release pin, assembled to cooperable structural elements, the pin being shown in its locked condition.

FIG. 4 is a view like that of FIG. 3, but showing the pin in the released condition with one of the structural elements removed therefrom.

FIG. 5 is a top plan view of the release bar per se, of the clevis pin.

As shown, the improved quick-release pin of the invention comprises an elongate tubular pin body 10 having a head or enlarged end portion 12 and an intermediate enlarged portion 14 resulting in annular shoulder means or shoulders 16, 18.

The pin body 10 has a main bore 20 of relatively small diameter, and an enlarged bore 22 of appreciably increased diameter, the bore 22 being disposed within the enlarged end or head portions 12, 14 of the pin.

FIG. 3 shows two structural parts 24, 26 having aligned openings in which the pin portions 10, 14 are accommodated. The structural part 24 is engaged with the shoulder 16 of the pin, whereas the structural part 26 is engaged with the shoulder 18 thereof.

In the bore 20 of the pin body 10 there is disposed and longitudinally movable a release rod 28 having a sloped cam portion 30 at one end, and having at its other end an enlargement or shoulder 32 engaged with one end of a helical compression spring 34 carried in the bore 22. The spring 34 at its other end is engaged with an internal shoulder 36, and tends to hold the release rod 28 in the locking position ilustrated in FIGS. 1 and 3.

In accordance with the present invention, the pin body 10 has at one end adjoining the cam portion 30 of the release bar 28 an open groove 38 extending transversely of the axis of the body 10, said groove slidably carrying a locking dog 40 which is actuated by the cam portion 30 of the release bar 28. The locking dog 40 preferably comprises a flat strip having a rectangular cross section as indicated in FIGS. 1 and 3, and is formed with a slot or aperture 42 through which the portion 30 of the release rod passes.

The transverse groove 38 in the end of the pin body 10 may be readily formed by a milling operation using a milling cutter, and in so doing there is formed a pair of integral guide ears 44 disposed on opposite sides of the groove 38, said ears being hooked around the locking dog 40 as indicated in FIG. 1 to retain the dog in its operative position in the groove. In effecting this, the ears 44 may be struck and bent by a suitable tool, forming retainer lugs 46. The lugs 46 loosely hold the locking dog 40 whereupon the latter is freely movable transversely of the pin body 10, as will be understood.

Referring to FIGS. 3 and 4 it will be seen that longitudinal movement of the release rod 28 can effect a lateral projection of the locking dog 40 as in FIG. 3, or else a retraction of the locking dog as indicated in FIG. 4. The FIG. 4 position represents the released condition of the clevis pin, this being effected by force from a finger 48 exerted on a manually engageable button 50 located adjacent the shoulder 32 of the release rod.

In accordance with the invention, retention of the release rod 28 in the pin body 10 is effected by an annular spun-in portion or flange 52 engaging the exterior of the shoulder 32, as indicated in FIGS. 3 and 4. The button 50 is shown as extending through the annular spun-in portion 52 of the pin, whereby it is readily accessible for finger pressure. It will be understood that removal of the finger pressure shown in FIG. 4 results in the return spring 34 shifting the release rod 28 from right to left, thereby effecting a projection of the locking dog 40 to the locking position of FIGS. 1–3.

From the foregoing it is seen that the locking dog 40 is disposed at the extreme front end portion of the pin body 10, whereby but very little of said body projects forwardly beyond the dog 40. Accordingly the clevis pin may be readily utilized in blind holes, wherein considerable depth is not available. By the provision of the open slot in which the locking dog 40 is carried, there also is had the advantage of being able to utilize a milling operation which may be quickly and easily effected, reducing the cost of fabrication of the pin body. The folding over of the ears 44 to produce the lugs 46, and the spinning in of the retainer portion 52 to prevent removal of the release rod 28 are quickly effected and represent low cost assembly operations.

It is seen that the entire pin construction involves relatively few parts which may be quickly and easily manufactured and assembled, resulting in a low manufacturing cost. The pin is reliable in its operation, and may be easily and quickly released and removed from the associated structural members. Moreover, the operation is foolproof whereby great reliability is had, with virtually no servicing requirements.

Variations and modifications may be made within the scope of the claims, and portions of the improvement may be used without others.

I claim:

1. A quick-release clevis pin comprising, in combination:
   (a) an elongate tubular pin body,
   (b) a release rod extending and movable longitudinally in the bore of the pin body,
   (c) said release rod having at one end a sloped cam portion, and
   (d) a locking dog carried by the pin body and movable thereon and transversely of the body between a locking position projecting from a side of the body and a releasing position wherein it does not project from the body,
   (e) said locking dog having an opening in which the cam portion of the release rod is disposed whereby longitudinal movement of the rod in one direction or the other effects either a lateral advance or a lateral retraction of the locking dog,
wherein the improvement comprises:
   (f) said pin body having at one end adjoining the cam portion of the release rod an open groove extending transversely across said end,
   (g) said locking dog being disposed in said groove and movable longitudinally thereof between its projecting and nonprojecting positions, and
   (h) means retaining the dog in said groove against displacement therefrom,
   (i) said pin body having, spaced from said one end, shoulder means between which and said locking dog there is an intervening space.

2. A clevis pin as in claim 1, wherein:
   (a) said dog retaining means comprises a pair of ears integral with the pin body and disposed on opposite sides of the groove,
   (b) said ears being hooked around the dog and constituting guides therefor.

3. A clevis pin as in claim 2, wherein:
   (a) the pin body has a bore of enlarged diameter at its other end, and
   (b) a spring disposed in said enlarged bore,
   (c) said release rod having a shoulder disposed in said enlarged bore and engaged with said spring,
   (d) said pin body having a spun-in portion located at the mouth of the enlarged bore and engaged with the shoulder of the release rod to retain the shoulder in the pin body.

4. A clevis pin as in claim 3, wherein:
   (a) the release rod has a manually engageable button adjacent the shoulder thereon, and
   (b) said spun-in portion of the pin body is annular,
   (c) said button extending through the annular spun-in portion of the pin body.

5. A clevis pin as in claim 1, wherein:
   (a) said dog comprises a flat strip of generally rectangular cross section, closely fitting said groove.

References Cited

UNITED STATES PATENTS

| | | | |
|---|---|---|---|
| 1,019,282 | 3/1912 | Strouse et al. | 292—140 |
| 1,489,668 | 4/1924 | Hathaway | 292—140 X |
| 2,424,090 | 7/1947 | Gordinier | 269—310 |

BERNARD A. GELAK, Primary Examiner

U.S. Cl. X.R.

85—5